US006982694B2

(12) United States Patent
Matsuzaki (10) Patent No.: US 6,982,694 B2
(45) Date of Patent: Jan. 3, 2006

(54) SOURCE DRIVER (75) Inventor: Toshiyuki Matsuzaki, Ushiku (JP)

(73) Assignee: Texas Instruments Incorporated, Dallas, TX (US)

( * ) Notice: Subject to any disclaimer, the term of this patent is extended or adjusted under 35 U.S.C. 154(b) by 283 days.

(21) Appl. No.: 09/742,036

(22) Filed: Dec. 20, 2000

(65) Prior Publication Data

US 2002/0126082 A1    Sep. 12, 2002

(30) Foreign Application Priority Data

Dec. 28, 1999    (JP)    ................................. 11-373492

(51) Int. Cl.
 *G09G 3/36*    (2006.01)
(52) U.S. Cl. ........................... 345/98; 345/55; 345/87; 345/204; 349/150
(58) Field of Classification Search .................. 345/50, 345/55, 87, 98, 204, 214, 44, 58, 59, 51, 345/48, 38, 90; 349/149–150, 152
 See application file for complete search history.

(56) References Cited

U.S. PATENT DOCUMENTS 5,680,191 A * 10/1997 Voisin et al. ................ 349/150
5,686,933 A * 11/1997 Okada et al. .................. 345/95
5,739,805 A * 4/1998 Dingwall ..................... 345/100
5,886,679 A * 3/1999 Matsuda et al. ............... 345/96
6,191,772 B1 * 2/2001 Mical et al. ................. 345/698
6,211,849 B1 * 4/2001 Sasaki et al. .................. 345/55
6,304,241 B1 * 10/2001 Udo et al. ..................... 345/96
6,335,721 B1 * 1/2002 Jeong ......................... 345/100
6,456,353 B1 * 9/2002 Chen .......................... 349/150
6,519,020 B1 * 2/2003 Cha et al. .................... 349/150

* cited by examiner

*Primary Examiner*—Vijay Shankar
*Assistant Examiner*—Leonid Shapiro
(74) *Attorney, Agent, or Firm*—William B. Kempler; W. James Brady, III; Frederick J. Telecy, Jr.

(57) ABSTRACT

A display device module that can supply high-speed signals with low distortion and drive high-load signal lines at high speed. A switch unit rearranges multiple input signals in accordance with switching control signals and inputs them to an internal circuit, as well as multiple source drivers, are arranged that have an internal processing circuit that generates drive signals based on the prescribed signal processing according to the output signals of the switch unit, switching control signals of different levels are supplied to odd- and even-numbered source drivers, the signal lines that transmit the multiple input signals are wired on the substrate so as to be parallel to each other without intersecting, and the input signals are supplied to the respective source drivers, thus making it possible to shorten the branching lines between the input signal lines and the input terminals of the source drivers, suppress the reflection of signals, and suppress the distortion of signal waveforms.

12 Claims, 6 Drawing Sheets

| Sw | INPUT | i1' | i2' | i3' | i4' | i5' | i6' |
|---|---|---|---|---|---|---|---|
| L | OUTPUT | i1 | i2 | i3 | i4 | i5 | i6 |
| H | | i6 | i5 | i4 | i3 | i2 | i1 |

SOURCE DRIVER

TECHNICAL FIELD OF THE INVENTION

This invention concerns a drive circuit that drives a liquid-crystal display device (LCD device).

BACKGROUND OF THE INVENTION

Figure 7:
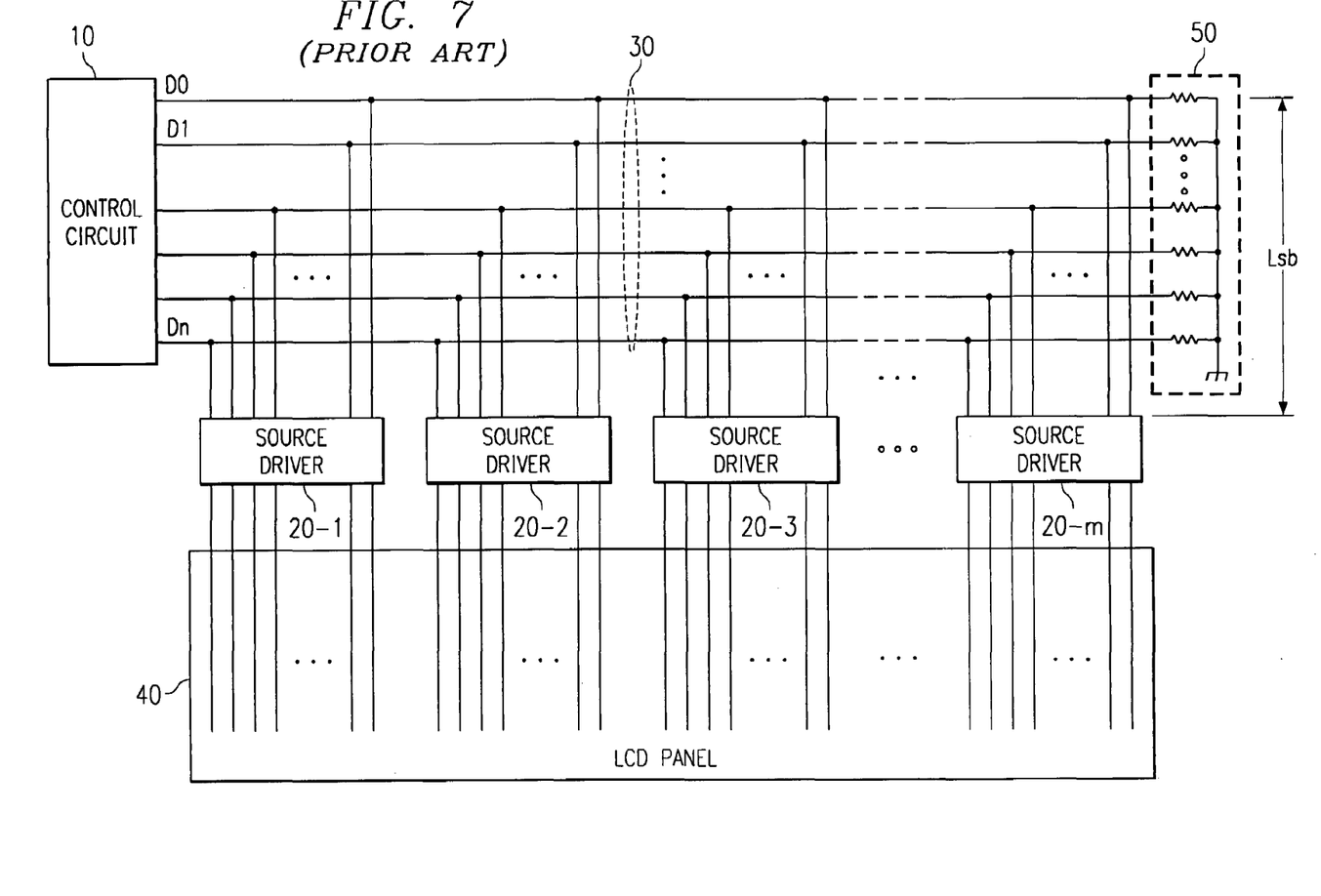
[FIG. 7] This is a diagram that shows an example of the composition of a general liquid-crystal display device.
Figure 8:
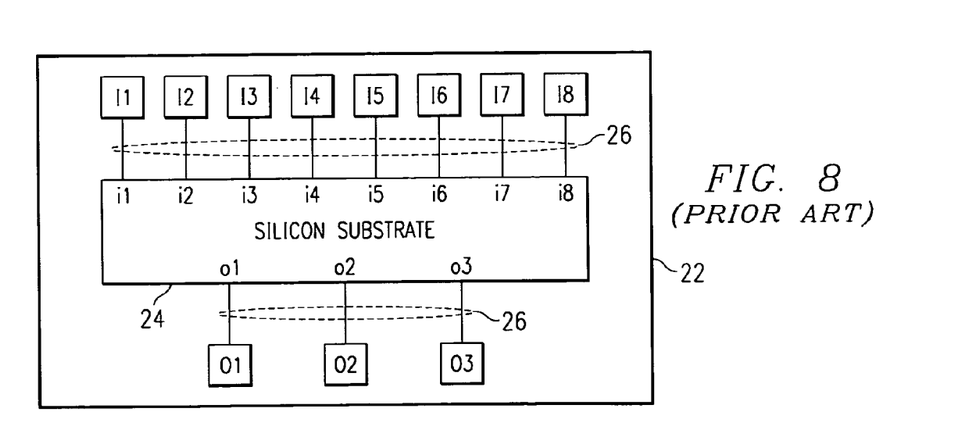
[FIG. 8] This is a diagram that shows an example of the composition of a source driver.

A liquid-crystal display device consists of a liquid-crystal panel composed of liquid-crystal display elements arranged in a matrix of rows and columns and a drive circuit that outputs drive signals to the liquid-crystal panel. Arranged on the liquid-crystal panel are signal lines that transmits drive signals to each liquid-crystal display element. The drive circuit displays images on the liquid-crystal panel by impressing drive signals that correspond to the display image on the liquid-crystal display elements of the liquid-crystal panel via these signal lines. FIG. 7 shows an example of a general liquid-crystal display device. As shown in the diagram, this liquid-crystal display device consists of control circuit 10, multiple source drivers 20-1, 20-2, ..., 20-m (where m is a natural number and m>2), data bus 30, and liquid-crystal panel (LCD panel) 40. As stated above, LCD panel 40 consists of multiple liquid-crystal display elements arranged in rows and columns. For example, in an XGA-standard LCD panel, it consists of 1024×768 liquid-crystal display elements. That is, one row (line) of the LCD panel consists of 1024 liquid-crystal display elements, and the LCD panel as a whole consists of 768 lines of liquid-crystal display elements. One picture element of an image is displayed by liquid-crystal display elements. The drive circuit of a liquid-crystal display device consists of multiple source drivers 20-1, 20-2, ..., 20-m. As shown in FIG. 7, the source drivers generate drive signals, which are analog signals, in accordance with the (n+1)-bit data D0, D1, ..., Dn output via data bus 30, and output these drive signals to the signal lines. That is, each source driver 20-1, 20-2, ..., 20-m has a digital-to-analog converter that converts the (n+1)-bit digital signals that are input to analog signals, and in accordance with the clock signal and other control signals input from control circuit 10 they convert the (n+1)-bit digital signals input via data bus 30 to analog signals and output them sequentially to the signal lines. A row of liquid-crystal display elements of LCD panel 40 are connected to each signal line. That is, each source driver 20-1, 20-2, ..., 20-m outputs a display signal one line at a time to LCD panel 40 via the signal lines and outputs the drive signal for each line sequentially to LCD panel 40, thereby making it possible to display a one-frame image on LCD panel 40. FIG. 8 shows an example of a source driver that comprises a drive circuit. Each source driver 20-1, 20-2, ..., 20-m shown in FIG. 7 has the same composition, so here we denote a general source driver by assigning symbol 20. Source driver 20 is composed so that silicon substrate 24 is sealed by resin on the surface of flexible printed wiring board (hereafter called for convenience flexible wiring board) 22, which is formed in, for example, a tape carrier package (TCP) and has flexibility. Also formed on the surface of flexible wiring board 22 is wiring 26, which consists of metal film having the prescribed pattern, and signal transmission between the outside and the integrated circuit (IC) formed on the silicon substrate is done via wiring 26. In FIG. 8, I1, I2, ..., I8 and O1, O2, O3 are input-output pads that are formed on the surface of flexible wiring board 22 by metal film having the prescribed pattern. Also, i1, i2, ..., i8 and o1, o2, o3 are signal input and output terminals on silicon substrate 24. The eight input pads and three output pads are shown here as an example, but in an actual source driver the number of input and output pads will vary depending on the number of input and output signals to be handled. As shown in FIG. 7, the drive circuit has multiple source drivers 20-1, 20-2, ..., 20-m. Normally, an LCD panel is driven by about 6-12 source drivers. For example, in the case of an XGA-standard LCD panel, it has 1024 pixels per line and displays each pixel with liquid-crystal elements that emit the three colors R, G, B, so in order to display the pixels of one line it is necessary to drive 1024×3 signal lines. With, for example, 384 output signal lines per source driver, all the liquid-crystal display elements of one line can be driven by eight source drivers.

Figure 9:
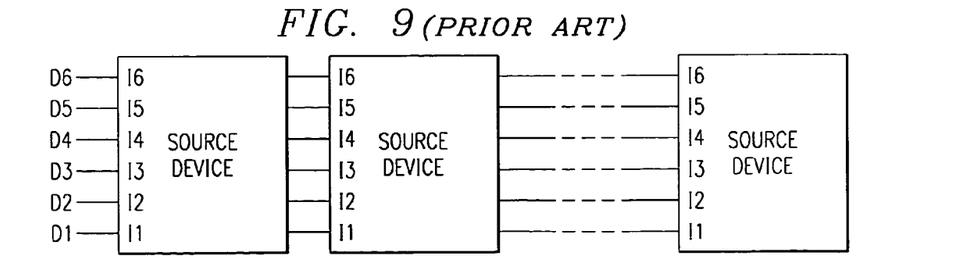
[FIG. 9] This is a diagram that shows an example of another arrangement of the source driver.

The demands made on drive circuits have grown ever more stringent in recent years as LCD panels have come to be made with larger size and higher precision. For example, with higher precision the number of pixels per line increases, and what is demanded is not just correspondingly more signal lines to drive them but also faster drive signals. In addition, a larger-size LCD panel means longer driving signal lines, greater load capacity of the drive circuit, and longer signal lines to transmit the pixel data to the drive circuit. With conventional drive circuits and their wiring methods there has been the disadvantage that the distortion of the transmission signal becomes greater, and it becomes difficult to supply signals having the expected waveform to each source driver. One cause of this arises due to the wiring formed between data bus 30 and the source driver shown in FIG. 7. Denoting the length of this wiring by Lsb, the distortion of the waveform increases with increasing Lsb. With regard to the signal lines of data bus 30, the signal lines formed between data bus 30 and the source drivers are formed in separate wiring layers on the substrate, so it is necessary to use a multi-layer wiring board. In order to shorten wiring length Lsb between data bus 30 and the source drivers, the source drivers could be arranged vertically as shown in FIG. 9. But because the source drivers that drive the LCD panel drive about 100–400 signal lines, it is necessary to expand the wiring region of the source drivers, and unlike a memory system, it is difficult to secure wiring region for a vertical arrangement such as that shown in FIG. 9, and normally this cannot be adopted.

SUMMARY OF THE INVENTION

A general object of this invention, which was devised in consideration of this situation, is to provide a display device module that can supply high-speed signals with low distortion and drive large-load signal lines at high speed.

This and other objects and features are a Named, in accordance with one aspect of the invention by a module for a display device having a semiconductor chip that has n (where n is a natural number and n>=2) signal input terminals as well as n input terminals and n output terminals to be connected respectively to said n signal input terminals, and includes a switching circuit that sequentially connects said first through n-th input terminals to said first through n-th output terminals respectively when a control signal is at the first logical level and sequentially connects said first through n-th input terminals to said n-th through first output terminals respectively when said control signal is at the second logical level, a drive signal generation circuit that generates drive signals that drive a display device based on image signals output from the output terminals of said switching circuit, and m (where m is a natural number and m>=2) signal output terminals for outputting said drive signals; a first substrate that includes n input terminals and n first lines that connect said input terminals and the signal input terminals of said semiconductor chip respectively, and m output terminals and m second lines that connect said output terminals and the signal output terminals of said semiconductor chip respectively, and on which said semiconductor chip is mounted; and a second substrate that includes n sets of signal terminals that correspond respectively to the n input terminals of said first substrate and n sets of lines that sequentially connect the first through n-th signal terminals of the N-th (where N is a natural number and 1<=N<=n−1) set to the n-th through first signal terminals of the (N+1)-th set respectively, and by which said n signal terminals are connected to the n input terminals of said first substrate. In this invention's module for a display device, preferably, the logical level of the control signals supplied to semiconductor chips arranged corresponding to odd numbers and the logical level of the control signals supplied to semiconductor chips arranged corresponding to even numbers are the reverse of each other. Also, in this invention's module for a display device, preferably, the n sets of signal terminals of said second substrate are arranged linearly approximately in a row, and the m output terminals of said first substrate are connected to the signal electrodes of a liquid-crystal display. Also, in this invention's module for a display device, preferably, said first substrate is a flexible substrate. Also, in this invention's module for a display device, the input terminals of said first substrate and the signal terminals of the second substrate include a first terminal and second terminal respectively, the first line of said first substrate includes a first wiring part that connects said first terminal and the signal input terminal of said semiconductor chip and a second wiring part that connects said second terminal and the signal input terminal of said semiconductor chip, and the wiring of said second substrate connects said second terminal and said first terminal in said signal terminals of adjacent sets.

The drive circuit of one embodiment, provides a switch unit that switches the lineup sequence of multiple input signals inside the drive circuit, the signal lines on the substrate can be wired in a one-stroke-of-the-pen wiring pattern in which they do not intersect each other, and by reducing the branching of signal lines and the effect caused by the reflection of signals, the distortion of signal waveforms can be suppressed. In addition, with this invention, in a source driver that comprises the drive circuit, by forming input pads in pairs and wiring between each pad and an input terminal on the internal circuit, branching of signal lines between the input pad and the input terminal of the internal circuit is eliminated and the reflection of signals is suppressed, with the advantage that distortion of signal waveforms can be reduced.

[Explanation of the symbols] 10 . . . control circuit 20-1, 20-2, . . . , 20-m source drivers 30 data bus 40 LCD panel 50 terminal resistance 100 source driver 110 silicon substrate 112 flexible wiring board 120 switch unit 122 processing unit 130, 130a input pad unit 132, 132a wiring 140 output pad unit 142 wiring 150 switching control signal input pad 200 data bus 210 control circuit 220 substrate 240 LCD panel 260 terminal resistance Vcc power source voltage GND ground electric potential.

DETAILED DESCRIPTION OF THE PREFERRED EMBODIMENTS

First Embodiment

Figure 1:
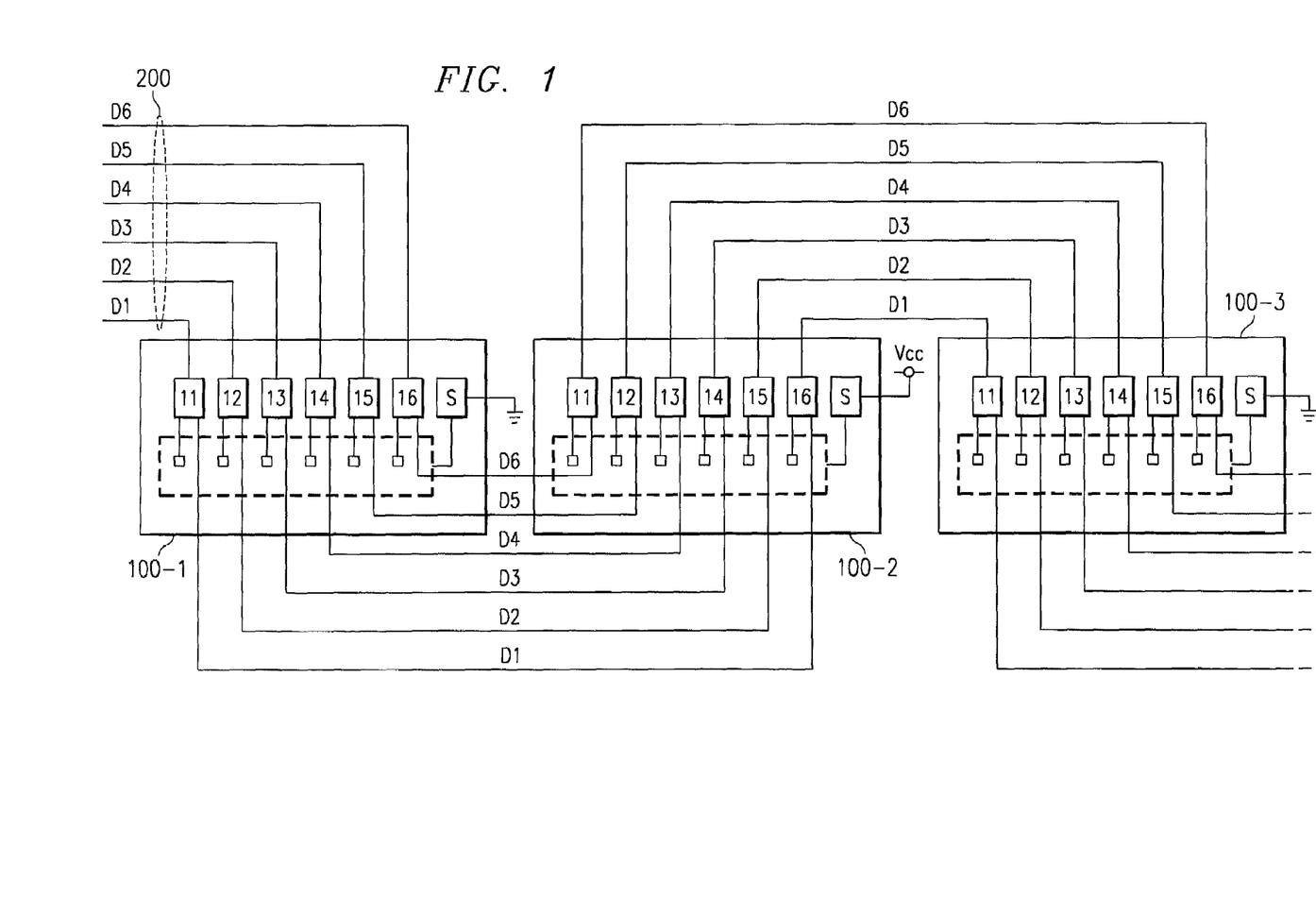
[FIG. 1] This is a circuit diagram that shows the first embodiment of the LCD panel drive circuit of this invention.
Figure 2:
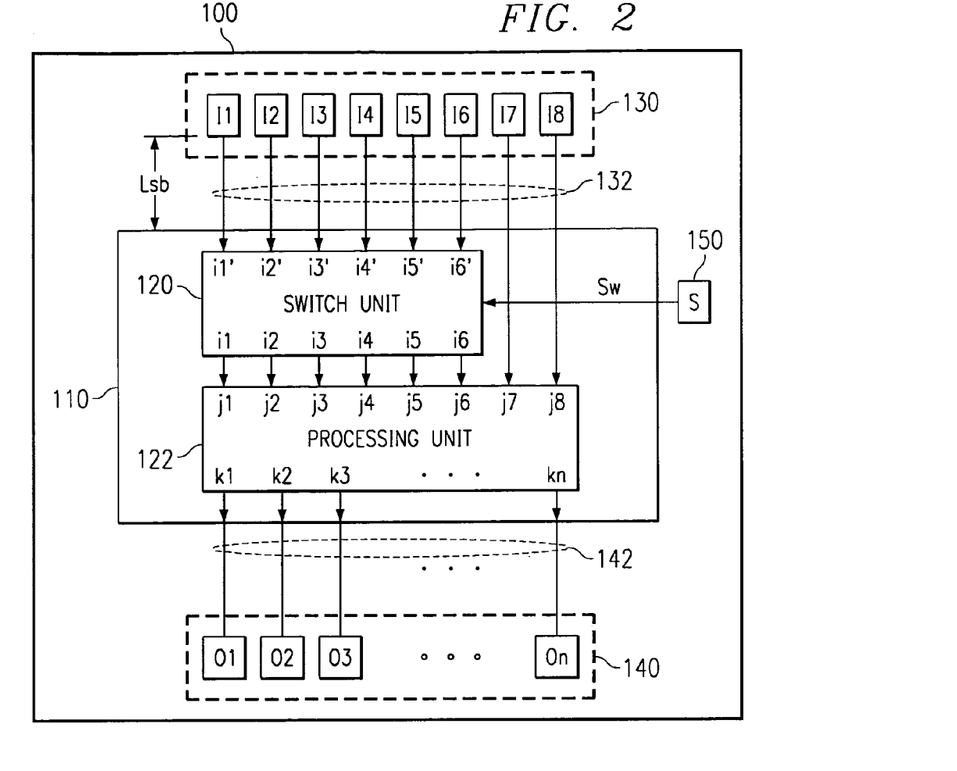
[FIG. 2] This is a diagram that shows an example of the composition of a source driver that comprises the drive circuit of this embodiment.
Figure 3:
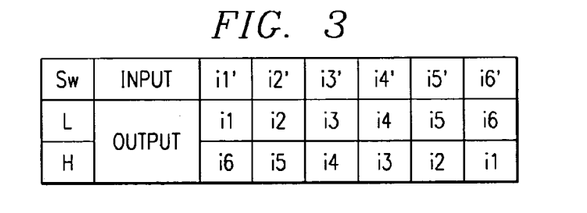
[FIG. 3] This is a diagram that shows the operation of the switch unit of the source driver.
Figure 4A:
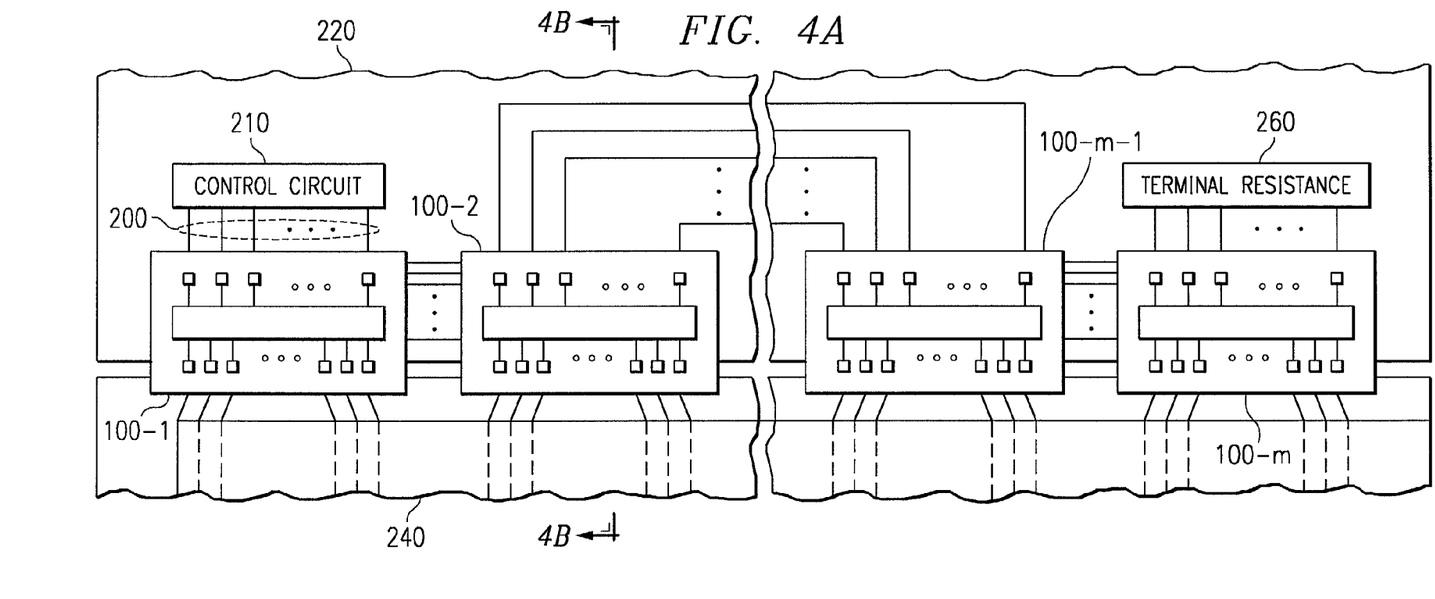
[FIG. 4] This is a diagram that shows an example of the composition of a liquid-crystal display device constituted using the drive circuit of this embodiment.
Figure 4B:
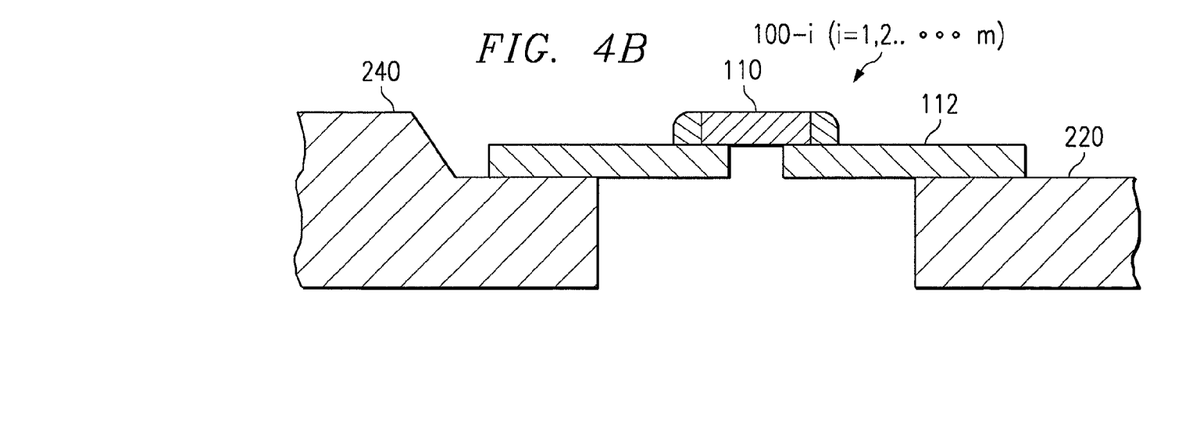

FIG. 1 is a circuit diagram showing the first embodiment of the drive circuit of this invention. FIG. 1 shows the arrangement of the source drivers that comprise the drive circuit of the first embodiment of this invention and the wiring method of the data bus that supplies signals to the source drivers. Also shown in FIG. 1 is part of the drive circuit consisting of source drivers 100-1, 100-2, 100-3. In each source driver, for example, digital signals are supplied by six input signal lines. Omitted from the diagram are signal lines that transmit drive signals from each source driver to the LCD panel. An actual drive circuit will have, for example, about 6–12 source drivers, and connected to each source driver are, besides the six digital signal lines that supply digital signals, a clock signal line and control signal lines that supply a clock signal and other control signals, as well as about 100–400 signal lines that are driven by the source drivers. FIG. 2 shows an example of the composition of a source driver that constitutes the drive circuit of this embodiment. Since each source driver 100-1, 100-2, 100-3 that makes up the drive circuit shown in FIG. 1 has the same composition, in FIG. 2, without loss of generality, a source driver that makes up the drive circuit of this embodiment is denoted labeled with the symbol 100. Source driver 100 that constitutes the drive circuit of this embodiment is formed by sealing with resin a silicon substrate (semiconductor chip) 110 on the surface of a flexible wiring board. Formed on the surface of the flexible wiring board are input pad unit 130 and output pad unit 140, which are made of a metal film having the prescribed pattern, lines 132 between input pad unit 130 and the input terminals of silicon substrate 110, and lines 142 between the output terminals of silicon substrate 110 and output pad unit 140. Drive signals that drive the LCD panel are generated by an integrated circuit (IC) formed on the silicon substrate in accordance with digital signals input from input pad unit 130 and clock signals and other control signals, and the drive signals are supplied to the LCD panel via lines 142 and output pad unit 140. Switch unit 120 and processing unit 122 are provided on the integrated circuit formed on silicon substrate 110. In accordance with switching control signal Sw, which is input via input pad 150, switch unit 120 converts the signals input from input terminals i1', i2', . . . , i6' into the prescribed lineup sequence and outputs them to output terminals i1, i2, . . . , i6, respectively. Also, output terminals i1, i2, . . . , i6 of switch unit 120 are connected to input terminals j1, j2, . . . , j6 of processing unit 122, respectively. FIG. 3 is a diagram that shows the principle of operation of switch unit 120, showing the connection relationship between the input terminals i1', i2', . . . , i6' of switch unit 120 and output terminals i1, i2, . . . , i6 when switching control signal Sw is at low level "L" and high level "H". As shown in the diagram, when switching control signal Sw is at low level "L", the signal input to terminal i1'is output to output terminal i1, the signal input to terminal i2' is output to output terminal i2, . . . , and the signal input to terminal i6' is output to output terminal i6. And when switching control signal Sw is at high level "H", the lineup sequence of the signals input to input terminals i1', i2', . . . , i6' is reversed by switch unit 120 and is output to output terminals i1, i2, . . . ,i6. For example, the signal input to terminal i1'is output to output terminal i6, the signal input to terminal i2' is output to output terminal i5, and the signal input to terminal i6' is output to output terminal i1. As stated above, switch unit 120 is provided on source driver 100, and the signals input to input terminals i1', i2', . . , i6' are rearranged and supplied to input terminals i1, i2, . . , i6 of processing unit 122 according to switching control signal Sw input from outside. If the drive circuit is put together using multiple source drivers 100 shown in FIG. 2, then for example switching control signals Sw of different levels are input to the odd-numbered and even-numbered source drivers, respectively. In this way, the signal lines of data bus 200 can be wired as shown in FIG. 1. That is, the signal lines of data bus 200 into which digital signals D1, D2, D6 can be wired in a "one-stroke-of-the-pen" wiring pattern, in which they are arranged parallel to each other without intersecting each other. As shown in FIG. 1, a switching control signal Sw that has a low level, for example, the level of the ground electric potential GND, is input to first source driver 100-1, a switching control signal Sw of high level, for example, the level of the power source voltage VDD, is input to second source driver 100-2, and a low-level switching control signal Sw is input to third source driver 100-3. That is, a low-level switching control signal Sw is input to the odd-numbered source drivers, and a high-level switching control signal Sw is input to the even-numbered source drivers. In odd-numbered source driver 100-1 or 100-3, the signal lines of the data bus that supplies digital signals D1, D2, . . . , D6 are connected to pads I1, I2, . . . , I6, respectively. Because a low-level switching signal Sw is input to source drivers 100-1 and 100-3, the digital signals input to pads I1, I2, . . . , I6 are output by switch unit 120 to its output terminals i1, i2, . . . , i6. On the other hand, in even-numbered source driver 100-2, the signal lines of the data bus that supplies digital signals D1, D2, . . . , D6 are connected to pads I6, I5, . . . , I1, respectively. Because a high-level switching signal Sw is input to source drivers 100-2, the digital signals input to input pads I6,I5, . . . , I1 are rearranged by switch unit 120 and output to its output terminals i1, i2, . . . , i6. Thus, in the wiring pattern of data bus 200 shown in FIG. 1, by virtue of the fact that different switching control signals Sw are supplied to the odd-numbered and even-numbered source drivers, digital signals D1, D2, . . . , D6 are input in correct sequence to the input terminals i1, i2, . . . , i6 of the processing unit of each source driver. FIG. 4 is a block diagram showing part of a liquid-crystal display device composed of the drive circuit and LCD panel of this embodiment. FIG. 4(*a*) is a plan view of the liquid-crystal display device, and FIG. 4(*b*) is a cross-sectional view of the liquid-crystal display device. As shown here, the liquid-crystal display device consists of control circuit 210 formed on substrate 220, multiple source drivers 100-1, 100-2, . . . , 100-m of TCP structure, and LCD panel display 240. Formed on substrate 220 are, besides control circuit 210, data bus 200, which transmits digital signals to source drivers 100-1, 100-2, . . . , 100-m, and data bus terminal resistance 260. The cross-sectional view of FIG. 4(*b*) is a cross-sectional view along line 4B—4B in FIG. 4(*a*). As shown here, source driver 100-i (where i=1, 2, . . . , m) consists of flexible wiring board 112 and silicon substrate 110, which is sealed by resin on said flexible wiring board 112. On the surface of flexible wiring board 112 are input and output pads and wiring formed by metal film formed in the prescribed patterns, and digital signals transmitted by data bus 200 are input via the input pads and wiring formed on the flexible wiring board to the integrated circuit formed on the silicon substrate. The digital signals that are input are rearranged by switch unit 120 of the integrated circuit according to switching control signal Sw and are input to processing unit 122. In processing unit 122, signals are generated that drive LCD panel 240 according to the digital signals and the other control signals that are input. The drive signals are input to the respective signal lines of LCD panel 240 via the wiring and output pads formed on the flexible wiring board. Also, although not shown in FIG. 4(*a*), the signal lines of data bus 200 wired on substrate 220 are wired in a one-stroke-of-the-pen wiring pattern in which they are arranged parallel to each other without intersecting each other as shown in FIG. 1, so in substrate 220 data bus 200 can be formed by one-layer wiring. In addition, wiring length Lsb from data bus 200 to the silicon substrate of the source driver is approximately determined by the wiring length between the input pads on the flexible wiring board and the input terminals on the silicon substrate, as shown in FIGS. 1 and 2. Thus said wiring length Lsb is much shorter than in the wiring method in a conventional drive circuit, which can reduce the waveform distortion of the signals supplied to the source driver. That is, the drive circuit and wiring method of this embodiment make it possible to supply high-speed digital signals to the source driver while suppressing waveform distortion of the signals.

Second Embodiment

Figure 5:
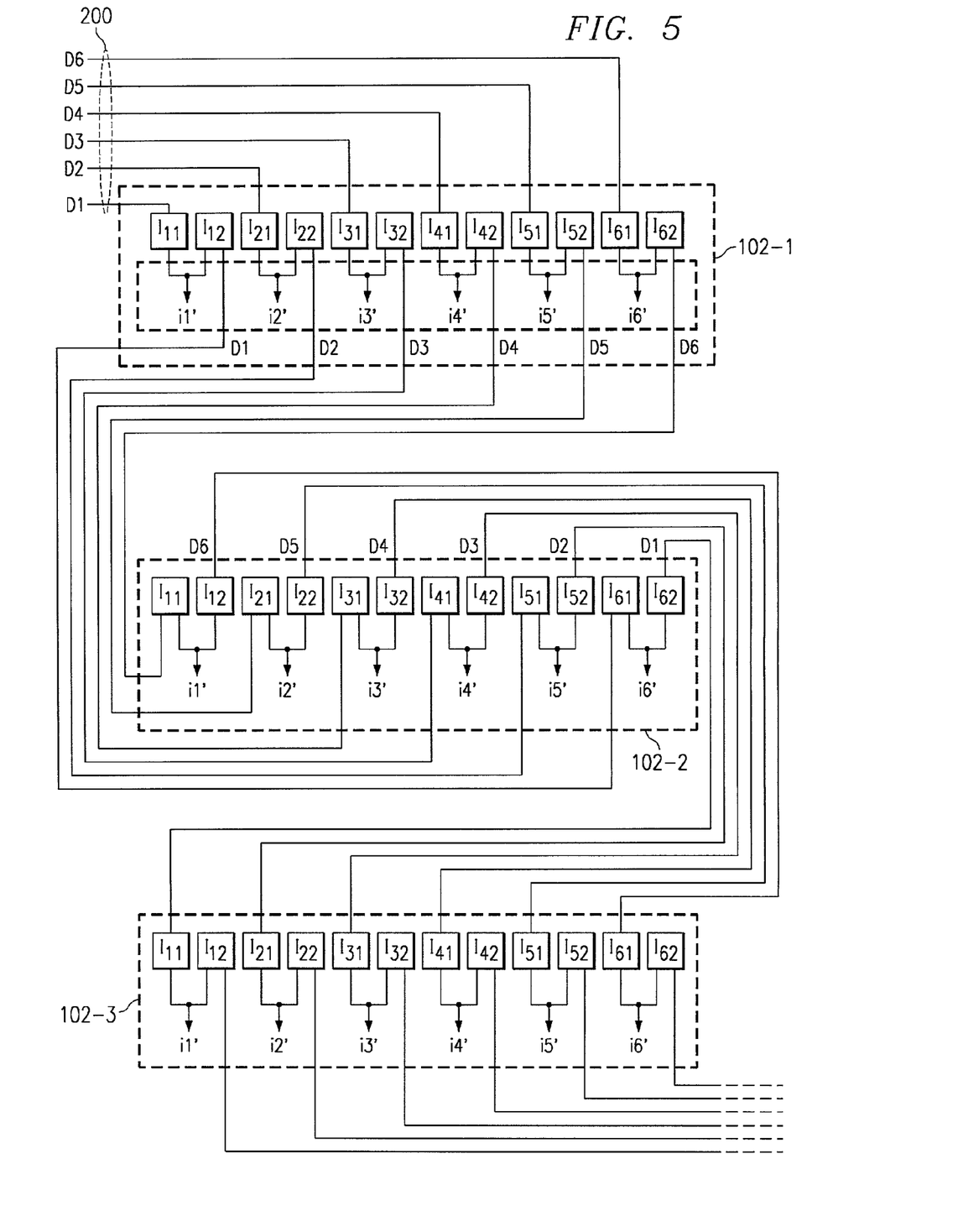
[FIG. 5] This is a circuit diagram that shows the second embodiment of the LCD panel drive circuit of this invention.
Figure 6:
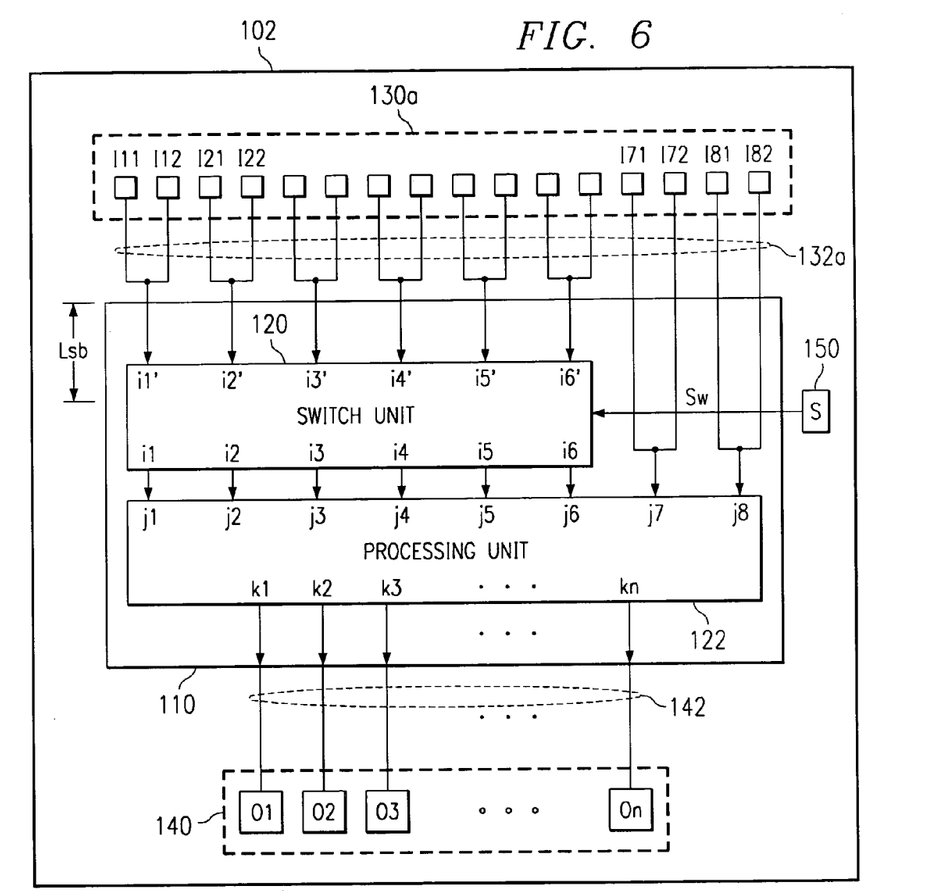
[FIG. 6] This is a diagram that shows an example of the composition of a source driver that comprises the drive circuit of the second embodiment.

FIG. 5 is a circuit diagram showing the second embodiment of the drive circuit of this invention. As shown here, the drive circuit of this embodiment consists of source drivers 102-1, 102-2, . . . , 102-3 . . . . The source drivers that comprise the drive circuit of this embodiment, like the source drivers of the first embodiment described above, have a switch unit on the integrated circuit formed on the silicon substrate. Said switch unit arranges digital signals D1, D2, . . . , D6 input to input pads I11, I21, . . . , I61 into the prescribed order according to switching control signal Sw and supplies them to the processing unit. FIG. 6 shows an example of the composition of a source driver. Labeled here with symbol 102 is a source driver that comprises the drive circuit of this embodiment. Source driver 102 of this embodiment is formed with, for example, silicon substrate 110 sealed by resin on the surface of a flexible wiring board. Also formed on the surface of the flexible wiring board are input pad unit 130*a* made of metal film having the prescribed patterns, lines 132*a* between the input pads and the input terminals of silicon substrate 110, output pad unit 140, and lines 142 between the output pads and silicon substrate 110. According to the digital signals, clock signal, and other control signals input from input pad unit 103*a*, an integrated circuit (IC) formed on the silicon substrate generates drive signals that drive the LCD panel, and these drive signals are supplied to the LCD panel via signal lines 142 and output pad unit 140. As shown here, in source driver 102, input pad unit 130a consist of multiple sets of pads in pairs. Formed between the two pads in each pair and the input terminal on silicon substrate 110 are two signal lines that are parallel to each other. For example, signal lines are formed between each of pads I11, I12, which form a pair, and input terminal i1' of switch unit 120 on the silicon substrate. In this way, U-shaped wiring is formed between each pad pair and the corresponding input terminal of silicon substrate 110. Digital signals input from the respective pads of pad unit 130a are input to input terminals i1', i2', ..., i6' of switch unit 120. Switch unit 120 rearranges the digital signals input to input terminals i1', i2', ..., i6' according to switching control signal Sw input from input pad 150 and outputs them to output terminals i1, i2, ..., i6. The operation of switch unit 120 is the same as that of the switch unit of the source driver of the first embodiment described above, so in the respective input and output terminals the connection relationship is switched according to switching control signal Sw as shown in FIG. 3. Signals output from output terminals i1, i2, ..., i6 of switch unit 120 and the clock signal and other control signals input from pads I71, I81 are input to input terminals ji, j2, ..., j7, j8 of processing unit 122, respectively. According to these signals input from the input terminals, processing unit 122 generates drive signals that drive the LCD panel and outputs them to output terminals ki, k2, ..., kn. The drive signals output from output terminals ki, k2, ..., kn are supplied to the LCD panel via lines 142 and output pads O1, O2, ..., On, respectively. As described above, in the drive circuit of this embodiment, switch units are provided on the respective source drivers, said switch units take digital signals that are input, arrange them in the prescribed order according to switching control signal Sw, and input them to the processing unit, so as shown in FIG. 5, the signal lines of the data bus that transmit digital signals D1, D2, ..., D6 are arranged in a one-stroke-of-the-pen wiring pattern in which they do not intersect each other, and data bus 200 can be formed with one layer of wiring. Also, with the drive circuit of this embodiment, in each source driver the input pads are constituted in pad pairs, and a signal line is formed between each pad of a pad pair and an input terminal on the silicon substrate, so the signal input from one side of a pad pair is input to the input terminal of the silicon substrate through wiring between its pad and an input terminal on the silicon substrate, and is transmitted to the other pad from said input terminal via the other line.

This makes it possible to eliminate any branching of signal lines from an input pad to the input terminal on the silicon substrate, thereby making it possible to suppress any signal reflection arising from the branching of signal lines and to reduce the waveform distortion of the input signals of the source driver. As described above, with the drive circuit of this embodiment, the wiring of the data bus that supplies digital signals to the source drivers can be done easily by one-layer wiring, the branching of signal lines on the silicon substrate with the input pads of the respective source drivers can be eliminated, and waveform distortion of input signals arising from the branching of signal lines can be suppressed. In the above description, the drive circuit of an LCD panel was taken as an example, but the drive circuit of this invention is not limited to use for an LCD panel; needless to say, the principles of this invention can also be applied to other drive circuits that drive signal lines that have a large load with high-speed signals. In particular, the drive circuit of this invention is effective for supplying input signals from multiple signal lines to multiple drive elements.

What is claimed is:

1. A module for a display device comprising:
a wiring substrate having a single level of wiring thereon;
a plurality of integrated circuits mounted on the wiring substrate in juxtaposition, each integrated circuit comprising a switching circuit having inputs coupled to n input terminals (where n is a natural number and n≧2) to receive data signals, the switching circuit generating I output signals (where I is a natural number≧2) coupled to a drive signal generation circuit for driving the display device each of the integrated circuits having the inputs arranged linearly in a row along a first side and the output on a second side parallel to the first side, the second side facing the display device, the first side facing away from the display device, the switching circuit sequentially connecting the first through n-th input terminals to the first through I-th output terminals respectively when a control signal is at a first logical level and sequentially connecting the first through n-th input terminals to the I-th through first output terminals, respectively when the control signal is at a second logical level;
wherein wiring on the wiring substrate is connected to the n input terminals to couple data signals to the inputs of the switching circuits, the wiring being parallel lines,
and wherein the wiring for the first integrated circuit approaches the integrated circuit on the wiring substrate from a first direction and the wiring for the second integrated circuit approaches the integrated circuit approaches the integrated circuit on the wiring substrate from a second direction opposite to the first direction.

2. A module for a display device comprising:
a wiring substrate having a single level of wiring thereon;
a plurality of integrated circuits mounted on the wiring substrate in juxtaposition, each integrated circuit comprising a switching circuit having inputs coupled to n input terminals (where n is a natural number and n≧2) to receive data signals, the switching circuit generating I output signals (where I is a natural number≧2) coupled to a drive signal generation circuit for driving the display device each of the integrated circuits having the inputs arranged linearly in a row along a first side and the output on a second side parallel to the first side, the second side facing the display device, the first side facing away from the display device, the switching circuit sequentially connecting the first through n-th input terminals to the first through I-th output terminals respectively when a control signal is at a first logical level and sequentially connecting the first through n-th input terminals to the I-th through first output terminals, respectively when the control signal is at a second logical level;
wherein wiring on the wiring substrate is connected to the n input terminals to couple data signals to the inputs of the switching circuits, the wiring being parallel lines, and wherein wiring between the n input terminals and the switching circuit comprise a continuous line between a first terminal, an input to the switching circuit and a second input terminal.

3. The module of claim 2 wherein the wiring substrate is a flexible substrate.

4. The module of claim 2 wherein the wiring for the first integrated circuit approaches the integrated circuit on the wiring substrate from a first direction and the wiring for the second integrated circuit approaches the integrated circuit approaches the integrated circuit on the wiring substrate from a second direction opposite to the first direction.

5. A module for a display device comprising:
a wiring substrate having a single level of wiring thereon;
a plurality of integrated circuits mounted on the wiring substrate in juxtaposition, each integrated circuit comprising a switching circuit having inputs coupled to n input terminals (where n is a natural number and n≧2) to receive data signals, the switching circuit generating I output signals (where I is a natural number≧2) coupled to a drive signal generation circuit for driving the display device each of the integrated circuits having the inputs arranged linearly in a row along a first side and the output on a second side parallel to the first side, the second side facing the display device, the first side facing away from the display device, the switching circuit sequentially connecting the first through n-th input terminals to the first through I-th output terminals respectively when a control signal is at a first logical level and sequentially connecting the first through n-th input terminals to the I-th through first output terminals, respectively when the control signal is at a second logical level;
wherein wiring on the wiring substrate is connected to the n input terminals to couple data signals to the inputs of the switching circuits, the wiring being parallel lines, wherein the wiring substrate is a flexible substrate and wherein the wiring for the first integrated circuit approaches the integrated circuit on the wiring substrate from a first direction and the wiring for the second integrated circuit approaches the integrated circuit approaches the integrated circuit on the wiring substrate from a second direction opposite to the first direction.

6. The module of claim 5 wherein wiring between the n input terminals and the switching circuit comprise a continuous line between a first terminal, an input to the switching circuit and a second input terminal.

7. The module of claim 1 wherein wiring between the n input terminals and the switching circuit comprise a continuous line between a first terminal, an input to the switching circuit and a second input terminal.

8. The module of claim 1 wherein the control signal coupled to the plurality of integrated circuits is at the first logic level for one integrated circuit of a pair of integrated circuits and is at the second logic level for another integrated circuit of the pair.

9. The module of claim 1 wherein the wiring substrate is a flexible substrate.

10. The module of claim 8 wherein wiring between the n input terminals and the switching circuit comprise a continuous line between a first terminal, an input to the switching circuit and a second input terminal.

11. The module of claim 2 wherein the control signal coupled to the plurality of integrated circuits is at the first logic level for one integrated circuit of a pair of integrated circuits and is at the second logic level for another integrated circuit of the pair.

12. The module of claim 5 wherein the control signal coupled to the plurality of integrated circuits is at the first logic level for one integrated circuit of a pair of integrated circuits and is at the second logic level for another integrated circuit of the pair.

* * * * *